(12) United States Patent
Kasuga et al.

(10) Patent No.: US 8,581,118 B2
(45) Date of Patent: Nov. 12, 2013

(54) SEAL STRUCTURE, METHOD OF FORMING SEAL STRUCTURE, WIRE BODY, AND ELECTRONIC APPARATUS

(75) Inventors: Takashi Kasuga, Osaka (JP); Hidehiko Mishima, Osaka (JP); Kazuya Maruyama, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 332 days.

(21) Appl. No.: 12/920,410

(22) PCT Filed: Aug. 31, 2009

(86) PCT No.: PCT/JP2009/065156
§ 371 (c)(1),
(2), (4) Date: Aug. 31, 2010

(87) PCT Pub. No.: WO2010/026935
PCT Pub. Date: Mar. 11, 2010

(65) Prior Publication Data
US 2011/0000712 A1  Jan. 6, 2011

(30) Foreign Application Priority Data

Sep. 3, 2008  (JP) .................................. 2008-225729
Oct. 30, 2008  (JP) .................................. 2008-279187
Jul. 27, 2009  (JP) .................................. 2009-174165

(51) Int. Cl.
*H02G 3/18* (2006.01)

(52) U.S. Cl.
USPC ........ 174/650; 174/77 R; 174/50.56; 277/316

(58) Field of Classification Search
USPC ............... 174/650, 50, 50.5, 50.51, 64, 77 R; 277/316; 361/772, 773
See application file for complete search history.

(56) References Cited

U.S. PATENT DOCUMENTS 5,563,378 A * 10/1996 Uchida et al. .................. 174/135
6,066,797 A *  5/2000 Toyomura et al. ............. 136/251
(Continued)

FOREIGN PATENT DOCUMENTS

CN           1195200 A    10/1998
CN         101057373 A    10/2007
(Continued)

OTHER PUBLICATIONS

Japanese Office Action, and English translation thereof, issued in Japanese Patent Application No. 2008-225729 dated Feb. 22, 2012.

(Continued)

*Primary Examiner* — Hoa C Nguyen
*Assistant Examiner* — Paresh Paghadal
(74) *Attorney, Agent, or Firm* — McDermott Will & Emery LLP

(57) ABSTRACT

A seal structure capable of achieving a waterproof structure at low cost while being flexibly adaptable to design change of a wire member, a method of forming the seal structure, a wire body and an electronic apparatus using them are provided. A seal structure 15 for sealing through holes 33, 43 of housings 31, 41 in which a wire member 20 is inserted is configured to include a covering C that includes a spacer member 11 disposed on one side of the through hole, secures the spacer member 11, the wire member 20 and the housings 31, 41 to each other and seals them.

10 Claims, 12 Drawing Sheets

(56) References Cited

U.S. PATENT DOCUMENTS

2007/0270180 A1* 11/2007 Takagi .................. 455/550.1
2008/0108250 A1* 5/2008 Shimada .................. 439/591

FOREIGN PATENT DOCUMENTS

| JP | 06-145647 | 5/1994 |
| JP | 07-162166 | 6/1995 |
| JP | 08-020082 | 1/1996 |
| JP | 2002-023890 | 1/2002 |
| JP | 2002-216265 | 8/2002 |
| JP | U 3127071 | 10/2006 |
| KR | 2007-0094013 A | 9/2007 |
| WO | WO 2006/095382 | 9/2006 |

OTHER PUBLICATIONS

Korean Office Action, and English translation thereof, issued in Korean Patent Application No. 10-2011-7007509 dated Jun. 14, 2012.

Chinese Office Action and English translation for Application No. 200980134549.7 dated Apr. 26, 2013.

* cited by examiner (a)

(b)

(a)

(b)

(c)

(a)

(b)

(c)

(a)

(b)

(c)

(a)

(b)

SEAL STRUCTURE, METHOD OF FORMING SEAL STRUCTURE, WIRE BODY, AND ELECTRONIC APPARATUS

RELATED APPLICATIONS

This application is the U.S. National Phase under 35 U.S.C. §371 of International Application No. PCT/JP2009/065156, filed on Aug. 31, 2009, which in turn claims the benefit of Japanese Application No. 2008-225729, filed on Sep. 3, 2008, Japanese Application No. 2008-279187, filed on Oct. 30, 2008 and Japanese Application No. 2009-174165, filed on Jul. 27, 2009, the disclosures of which Applications are incorporated by reference herein.

TECHNICAL FIELD

The present invention relates to a seal structure for a housing of a portable terminal, PDA, personal computer or the like, a method of forming the seal structure, a wire body, and an electronic apparatus including the seal structure and the wire body.

BACKGROUND ART

An FPC (Flexible Printed Circuit)-integrated gasket has been known. The FPC-integrated gasket has a seal structure for sealing a through hole provided in a housing of an electronic apparatus such as portable terminal.

Patent Document 1 discloses in FIGS. 1 to 3 an FPC-integrated gasket integrated with an FPC (30) and formed in the shape of a grommet. The FPC-integrated gasket (1) includes a pair of gaskets (10) formed of a rubber-like elastic body. At an end of each gasket (10), a protrusion (50) for sealing a through hole (3) of a housing (2) is provided. The protrusion (50) has a tapered surface (53) tapering toward an end face (54) from a face (52) with a cross sectional area larger in diameter than the through hole (3) of the housing (2).

In this FPC-integrated gasket (1), the protrusion (50) is tightly fit with an end of the through hole (3) and thus water is prevented from entering the housing (2). Namely, a pair of gaskets (10) is used to waterproof two housings (2) while electric signals can be transmitted and received between respective circuits in the housings (2).

PRIOR ART DOCUMENTS

Patent Documents

Patent Document 1: Japanese Utility Model Registration No. 3127071

SUMMARY OF THE INVENTION

Problems To Be Solved By The Invention

The above-described conventional FPC-integrated gasket, however, involves the following drawbacks.

First, a mold or the like is required for integrally forming the protrusion (50) and the FPC (30). Then, each time the FPC design is changed, a new injection mold becomes necessary, leading to increase in cost.

Second, because of the need for integration with the FPC (30), the material for the rubber-like elastic body of which the gasket (10) is formed has to be selected from limited alternatives.

Third, there is a case where in a narrow space between two housings in an electronic apparatus such as the space of a slide portion of a slide-type mobile terminal, the housings and a wire member have to be sealed. If the above-described gasket structure is applied to this case, because of a considerably large dimension of the height of the whole gasket, it is difficult to place the gasket in such a small gap.

An object of the present invention is to provide a seal structure or the like for an electronic apparatus for example that is flexibly adaptable to design change of a wire member of an FPC or the like and that can be formed at low cost.

Means for Solving the Problems

A seal structure of the present invention is used for sealing a through hole of a housing with a wire member inserted in the through hole. The seal structure is configured to include a covering that has a spacer member disposed on one side of the through hole, and secures the spacer member, the wire member and the housing to each other and seals the spacer member, the wire member and the housing.

The seal structure of the present invention uses the covering to fill a gap generated due to a level difference corresponding to the thickness of the wire member, which ensures that water or the like is prevented from entering from the through hole.

The spacer member has an opening in which the wire member is inserted, and the covering may be configured to include an adhesive layer in which a part of the wire member is embedded and which closes the opening. The wire member extends through the opening of the spacer member and further through the through hole into the housing.

The spacer member is secured to the region around the through hole of the housing, and thus the inside of the housing can surely be sealed. The opening of the spacer member may only allow the wire member to be inserted therethrough, and the spacer member has a simple structure. Because the spacer member and the wire member can be formed separately, the seal structure of the present invention is flexibly adaptable to design change of the wire member. Further, unlike Patent Document 1, integration with the FPC or the like is unnecessary, and the material can be selected from a wider range of alternatives. Thus, the spacer member with the simple structure can be used to achieve a waterproof structure at low cost. Further, the spacer member may be a thin ring or flat plate so that the waterproof structure can also be achieved in a narrow space.

The covering may be configured to include a lid member opposite to the spacer member with a part of the wire member held between the lid member and the spacer member, and include an adhesive layer in which a part of the wire member is embedded and which closes a gap between the spacer member and the lid member. This structure uses the lid member to seal a most part of the through hole and uses the adhesive layer to fill the gap between the wire member and the spacer member. In this way, the inside of the housing can surely be sealed.

The covering may be configured to include an adhesive layer which is provided on the spacer member, in which a part of the wire member is embedded and which closes the opening of the spacer member. In this way as well, the wire member and the spacer member are surely sealed on one side of the spacer member. The spacer member of the simpler structure can thus be used to form the waterproof structure at low cost without using the lid member.

The covering may be configured to include a securing member disposed between a region surrounding the opening of the housing and the spacer member. The securing member is provided in advance on the surface of the spacer member opposite to the housing, and thus the spacer member can be easily attached to the housing. As the securing member, a double-sided waterproof tape may be used.

The adhesive layer may be formed of a resin adhesive with repairability (peeling property). The adhesive layer formed of a resin adhesive with repairability enables the wire member having been connected unsuccessfully to be connected again. In this way, the seal structure excellent in practical use can be obtained.

Preferably, as the resin adhesive with repairability, a resin mixture of a thermosetting resin and a thermoplastic resin is used. When only the thermosetting resin is used as the resin adhesive, the adhesive lacks repairability and thus is less appropriate for practical use. When only the thermoplastic resin is used as the resin adhesive, the adhesive has less adhesiveness and thus less reliability. In contrast, if an adhesive tape is used, a gap corresponding to the thickness of the wire member cannot be filled. Then, it has been found that a certain thermosetting resin and a certain thermoplastic resin may be mixed to obtain the adhesive layer with repairability and high reliability of adhesion.

Specifically, a mixture of one resin or two or more resins selected from the group of thermosetting resins including epoxy resin, phenolic resin, acrylic resin, urethane resin, alkyd resin, and unsaturated polyester resin, for example, and one resin or two or more resins selected from the group of thermoplastic resins including polyvinyl alcohol resin, acrylic resin, phenoxy resin, and urethane resin, for example, may be used. Preferably, an additive such as coupling agent, inorganic filler, fire retardant, or the like is added appropriately.

In the seal structure, preferably the covering further includes a tape member covering a region around the through hole of the housing. The stress exerted on the covering when the wire member is pulled can be alleviated by the tape member. Accordingly, the seal structure has improved reliability.

A method of forming the seal structure of the present invention may follow the procedure as follows. First, the wire member is inserted into the through hole (step (a)). Next, in a closed annular region around the through hole, a space between the spacer member, the wire member and the housing is filled with a fluid resin adhesive with repairability (step (b)). After this, the resin adhesive is solidified (step (c)).

In step (b), a method may be performed according to which the resin adhesive is provided on at least a part of a surface of the spacer member abutting on the wire member or the housing, and thereafter the spacer member is pressed from above. For example, a partially-set and film-shaped resin adhesive is provided between the wire member and the housing, and hot pressing is performed to make the adhesive fluid. Alternatively, a fluid resin adhesive is provided between the wire member and the housing and a pressure is applied from above the lid member.

With any of the above-described methods, the space between the housing, the wire member and the spacer member is filled with the fluid resin adhesive. Thus, the seal structure of excellent waterproof can be formed through the simple process.

A wire body including a wire member and a covering may be produced in advance. The covering includes a spacer member having an opening in which the wire member is inserted, and the covering seals the wire member and the spacer member on one side of the spacer member. Preferably, the wire body is attached to close the through hole. Then, the spacer member is secured to the region around the through hole of the housing with the adhesive layer held between the spacer member and the region, and accordingly the inside of the housing can surely be sealed. Further, the seal structure can be easily formed.

The covering may be configured to include a lid member opposite to the spacer member with a part of the wire member held between the lid member and the spacer member, and an adhesive layer in which a part of the wire member is embedded and which closes a gap between the spacer member and the lid member.

Further, the covering may be configured to include an adhesive layer in which a part of the wire member is embedded and which closes the opening of the spacer member.

On a side of the spacer member opposite to a side thereof on which the adhesive layer is provided, a securing member forming an adhesive layer between the housing and the spacer member may be provided in advance. As the securing member, a double-sided waterproof tape may be used. With this structure employed, the waterproof structure can be formed merely by pressing the wire member through the securing member.

The electronic apparatus of the present invention includes the above-described seal structure, and the waterproof structure for the electronic apparatus can be formed at low cost. A portable terminal is a typical electronic apparatus. Some portable terminals each include a display unit housing and an input unit housing coupled by a hinge portion, and some portable terminals each include a display unit housing and an input unit housing coupled by a slide portion. The wire body extends from the hinge portion or slide portion and runs through respective through holes of the housings to be connected to respective internal circuits of the housings. The seal structure seals the region around the through hole of each housing. In particular, the present invention applied to a slide-type portable terminal with a narrow space exhibits excellent effects.

EFFECTS OF THE INVENTION

The seal structure, the wire body and the electronic apparatus of the present invention can provide a waterproof structure at low cost while flexibly adapting to design change of the wire member. Further, the waterproof structure can also be placed in a narrow space.

MODES FOR CARRYING OUT THE INVENTION

First Embodiment

Figure 1:
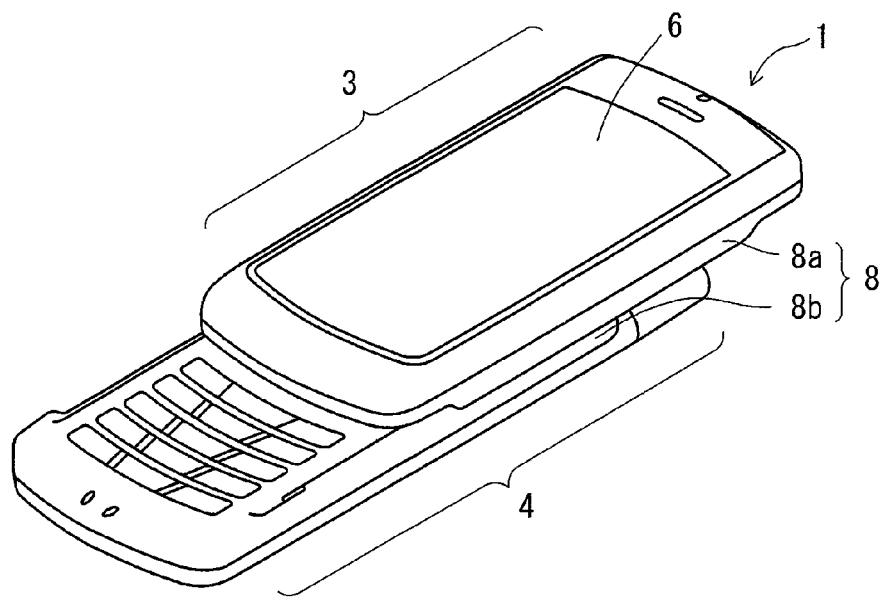
FIG. 1 is a perspective view schematically showing a structure of a portable terminal according to a first embodiment of the present invention.

FIG. 1 is a perspective view schematically showing a structure of a portable terminal (electronic apparatus) to which the present invention is applied.

Portable terminal 1 includes a display unit 3 for displaying various kinds of information, an input unit 4 and a slide portion 8. Display unit 3 is provided with a display apparatus 6 for which a liquid crystal display panel is used, and a speaker, for example. Input unit 4 is provided with input keys and a microphone, for example. Slide portion 8 is configured to include an outer frame 8a provided on display unit 3 side and an inner frame 8b provided on input unit 4 side in such a manner that the frames are slidably fit with each other.

Figure 2:
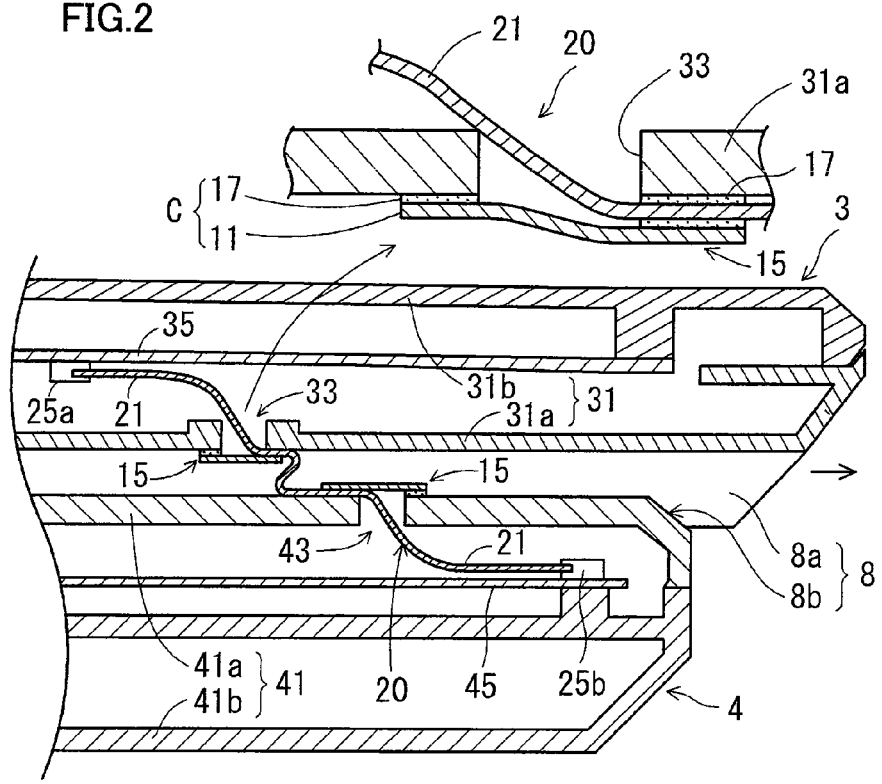
FIG. 2 is a cross section showing a structure of a connecting portion by means of a slide portion in the portable terminal according to the first embodiment.
Figure 3:
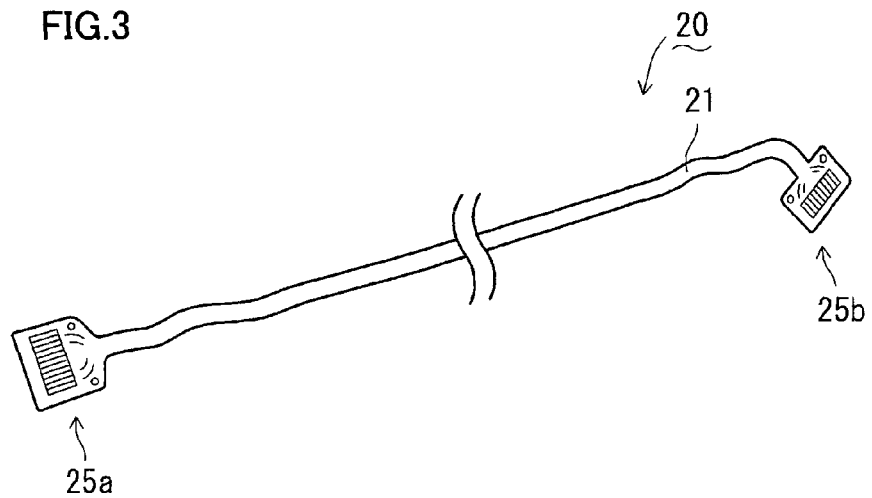
FIG. 3 is a plan view of a wire body according to the first embodiment.

FIG. 2 is a cross section showing a structure of a connecting portion by means of slide portion 8 of portable terminal 1 according to a first embodiment. FIG. 3 is a plan view of a wire body 20.

Display unit 3 includes a display unit housing 31 and a display unit substrate 35 as main components. Display unit substrate 35 includes a circuit or the like for transmitting a display signal to display apparatus 6. Display unit housing 31 includes a first housing 31a and a second housing 31b coupled to each other. First housing 31a has a through hole 33.

Input unit 4 includes an input unit housing 41 and an input unit substrate 45 as main components. Input unit substrate 45 includes a circuit or the like for controlling a signal that is transmitted from an input key. Input unit housing 41 includes a first housing 41a and a second housing 41b coupled to each other. First housing 41a has a through hole 43.

Wire body 20 is provided through slide portion 8 for connecting input unit substrate 45 and display unit substrate 35. Wire body 20 includes an FPC 21 and harness portions 25a, 25b that are provided respectively on the opposite ends of FPC 21. Harness portions 25a and 25b are configured to be connected respectively to substrates 35 and 45 so that signals can be transmitted and received therebetween.

As shown in the partially enlarged cross section in FIG. 2, a seal portion 15 is provided around through hole 33 of display unit housing 31. Seal portion 15 is provided with a covering C including a spacer member 11 that covers one side of through hole 33, and an adhesive layer 17 that secures spacer member 11 to the housing. Spacer member 11 is a flexible resin sheet. Adhesive layer 17 is formed of a resin adhesive having repairability as described later. The structure of seal portion 15 will be described in detail with reference to FIG. 4 (a) to FIG. 4 (c).

Figure 4:
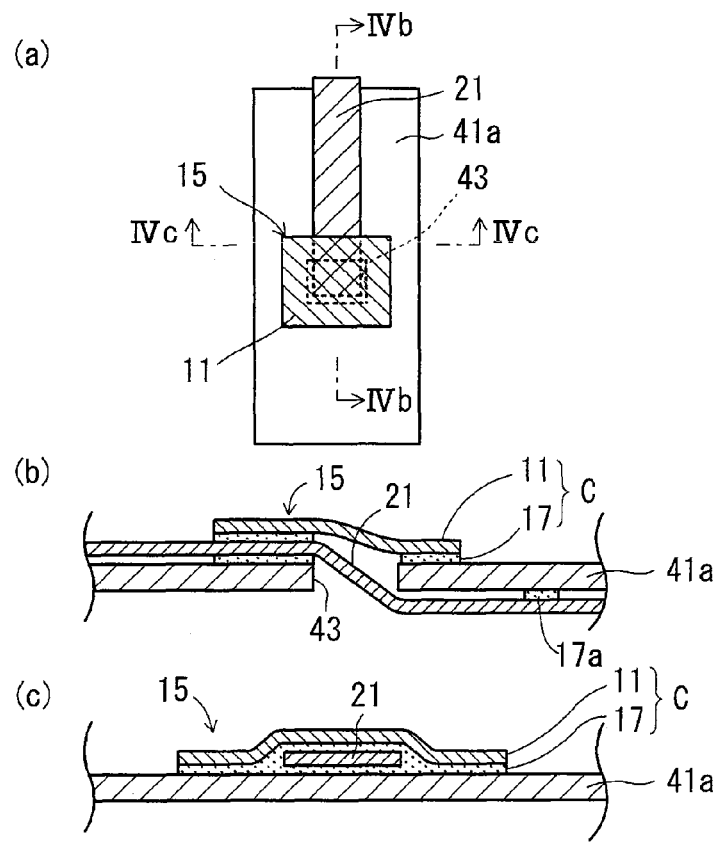
FIG. 4 (a) is a plan view showing in detail a structure around a through hole of an input unit housing, FIG. 4 (b) is a cross section along line IVb-IVb and FIG. 4 (c) is a cross section along line IVc-IVc.

FIG. 4 (a) is a plan view showing in detail a structure around through hole 43 of input unit housing 41, FIG. 4 (b) is a cross section along line IVb-IVb and FIG. 4 (c) is a cross section along line IVc-IVc.

In seal portion 15, adhesive layer 17 fills a space between FPC 21 and first housing 41a, a space between FPC 21 and spacer member 11 and a space between spacer member 11 and first housing 41a. Namely, adhesive layer 17 secures spacer member 11, FPC 21 and first housing 41a to each other. Adhesive layer 17 also seals the gaps therebetween to form covering C. On the rear side of first housing 41a as well, FPC 21 is secured to first housing 41a by a second adhesive layer 17a. Second adhesive layer 17a is provided not for waterproofing purpose but for allowing the work for forming the seal structure to be conducted in a stable state.

Here, the resin adhesive forming adhesive layer 17 is a resin adhesive having repairability (peeling property). As a resin adhesive with repairability, a resin mixture of a thermosetting resin and a thermoplastic resin may be used.

Specifically, a mixture of one resin or two or more resins selected from the group of thermosetting resins including epoxy resin, phenolic resin, acrylic resin, urethane resin, alkyd resin, and unsaturated polyester resin, for example, and one resin or two or more resins selected from the group of thermoplastic resins including polyvinyl alcohol resin, acrylic resin, phenoxy resin, and urethane resin, for example, may be used. Preferably, an additive such as coupling agent, inorganic filler, fire retardant or the like is added appropriately.

The structure around through hole 33 of display unit housing 31 is basically similar to the structure shown in FIG. 4 (a) to FIG. 4 (c) (see the enlarged cross section in FIG. 2).

The structure as described above is used to seal the inside of housings 31, 41 each, and accordingly prevent water and moisture from entering each of substrates 35, 45. Portable terminal 1 of the present embodiment therefore has a waterproof structure that can be used in a water or humid environment.

FPC 21 is generally configured to include a base film where a circuit layer is formed, and a coverlay that covers the base film. As a material for the base film, polyimide resin, polyester resin, glass epoxy resin or the like may be used. As a material for the coverlay, generally the same material as the base film is used. In addition, any of epoxy resin, acrylic resin, polyimide resin, and polyurethane resin for example may be used.

The wire member forming wire body 20 is not limited to FPC 21. Other than FPC 21, a rigid printed circuit board (PCB) or a flat cable for example may be used. As long as the wire member is any of these flat wire members, spacer member 11 can be attached to achieve the waterproof structure.

Examples of the material for spacer member 11 include glass epoxy resin, epoxy resin, acrylic resin, polyimide resin, polyurethane resin, and the like. In particular, the same material as the material for the base film and cover lay of FPC 21 may be used.

Description of Sealing Capability

Next, the sealing capability of seal portion 15 in the present embodiment will be described.

Figure 6:
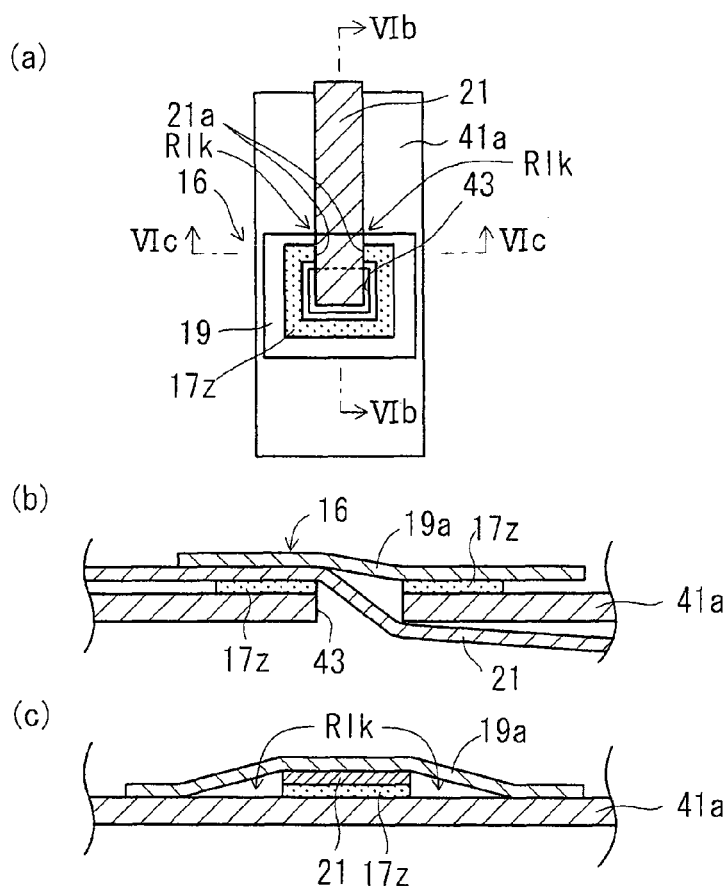
FIG. 6 (a) is a plan view of a seal portion in a conventional seal structure, FIG. 6 (b) is a cross section along line VIb-VIb and FIG. 6 (c) is a cross section along line VIc-VIc.

FIG. 6 shows a conventional seal structure for describing the sealing capability. FIG. 6 (*a*) is a plan view of a comparative seal portion 16, FIG. 6 (*b*) is a cross section along line VIb-VIb and FIG. 6 (*c*) is a cross section along line VIc-VIc. In these drawings, the same component as the corresponding one in FIG. 4 (*a*) to FIG. 4 (*c*) will be denoted by the same reference character, and the description thereof will not be repeated.

As shown in FIG. 6 (*a*), comparative seal portion 16 includes a seal tape 19*a* such as single-sided adhesive tape, instead of spacer member 11. The structure of other components is identical to the seal portion in the present embodiment. In comparative seal portion 16, a double-sided adhesive tape 17*z* is used to attach FPC 21 to first housing 41*a*. Seal tape 19*a* covers FPC 21 and double-sided adhesive tape 17*z*.

In comparative seal portion 16, there is a level difference between FPC 21 and double-sided adhesive tape 17*z*. Therefore, a leak area Rlk that cannot be sealed by double-sided adhesive tape 17*z* and seal tape 19*a* is left at the level-difference portion. Thus, comparative seal portion 16 cannot accomplish the waterproof capability.

As for seal portion 15 in the present embodiment shown in FIG. 4, covering C is formed with which spacer member 11, FPC 21 and first housing 41*a* are firmly secured to each other by the contraction force of the resin adhesive of adhesive layer 17. In this way, a barrier without gap is formed around through hole 43, and water and the like is surely prevented from entering.

Here, although a thermosetting resin such as epoxy resin can be used to form a barrier without leakage area, the thermosetting resin as used is difficult to peel off and thus re-connection (repair) cannot be made. For this reason, the structure where only the adhesive layer using a thermosetting resin is formed has little practicability. As for the thermoplastic resin, the adhesive force is weaker and the reliability of adhesion is insufficient. The inventors of the present invention have confirmed through experiments that the above-described resin adhesive can be used to form an adhesive layer with repairability and high reliability of adhesion.

Procedure for Forming Seal Portion 15

Figure 5:
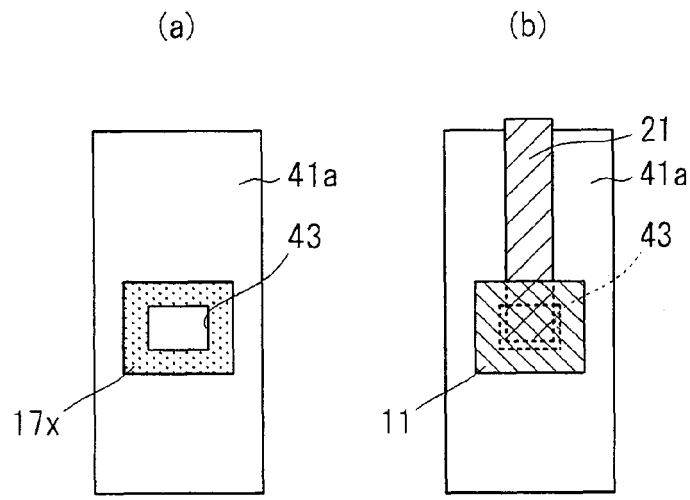
FIG. 5 (a) and FIG. 5 (b) are each a plan view illustrating a procedure for forming a seal portion.

FIG. 5 (*a*) and FIG. 5 (*b*) are each a plan view illustrating a procedure for forming seal portion 15.

First, as shown in FIG. 5 (*a*), a resin body 17*x* of a resin adhesive is applied to surround the perimeter of through hole 43 of first housing 41*a*.

Next, as shown in FIG. 5 (*b*), FPC 21 and spacer member 11 are attached from above resin body 17*x* of the resin adhesive, and spacer member 11 is pressed.

Here, as resin body 17*x*, any of the following two different types for example may be used.

A first type is resin body 17*x* of a partially-set adhesive film. In this case, resin body 17*x* is held between the wire member and the housing, and hot-pressing is performed from above spacer member 11 so that the resin body is made fluid.

A second type is fluid resin body 17*x*. In this case, it is only necessary to hold resin body 17*x* between the wire member and the housing and perform pressing from above spacer member 11.

With any of these types, the gap between spacer member 11, FPC 21 and first housing 41*a* is filled with the fluid resin adhesive.

After this, the resin adhesive solidifies to form adhesive layer 17 securing spacer member 11, FPC 21 and first housing 41*a* to each other. At this time, in order to promote solidification, heat may be applied to the extent that does not influence FPC 21 for example.

Then, as the resin adhesive solidifies, the resin adhesive exerts contraction force to cause spacer member 11, FPC 21 and first housing 41*a* to be firmly fixed to each other. In this way, covering C as shown in FIG. 4 (*a*) to FIG. 4 (*c*) is formed and accordingly the seal structure is formed. Namely, a barrier that surely prevents water and the like from entering is formed around through hole 43.

Modifications

Figure 7:
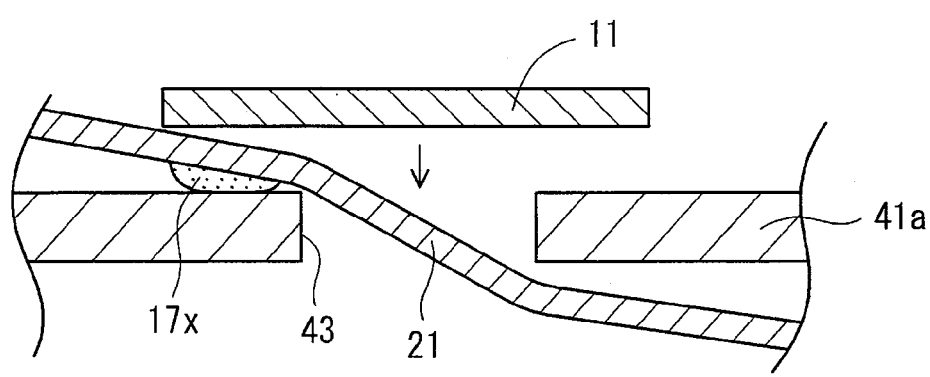
FIG. 7 (a) and FIG. 7 (b) are cross sections showing first and second modifications respectively of the first embodiment for illustrating a method of applying a resin adhesive.
Figure 7:
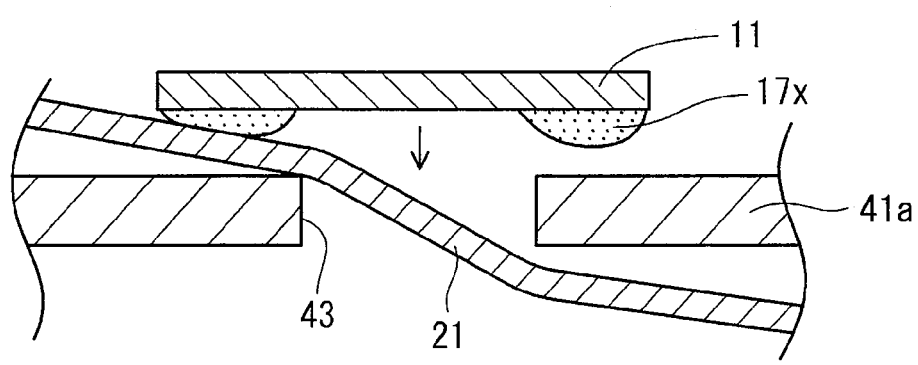

FIG. 7 (*a*) and FIG. 7 (*b*) are cross sections showing first and second modifications respectively of the first embodiment for illustrating a method of applying a resin adhesive.

In a first modification as shown in FIG. 7 (*a*), resin body 17*x* that is a fluid resin adhesive is applied to a part of the rear surface of FPC 21.

In a second modification as shown in FIG. 7 (*b*), resin body 17*x* of a fluid resin adhesive is applied to a part of the rear surface of spacer member 11.

After this, in both of these modifications, spacer member 11 is pressed from above to cause resin body 17*x* of the resin adhesive to enter the gap between spacer member 11, FPC 21 and first housing 41*a*.

In both of the modifications, resin body 17*x* of a partially-set adhesive film may be used instead of the fluid and hot-pressing may be performed to make the resin adhesive fluid.

Thus, in both of the first and second modifications, the resin adhesive solidifies and accordingly the seal structure shown in FIG. 4 (*a*) to FIG. 4 (*c*) can be obtained.

Second Embodiment

Figure 8:
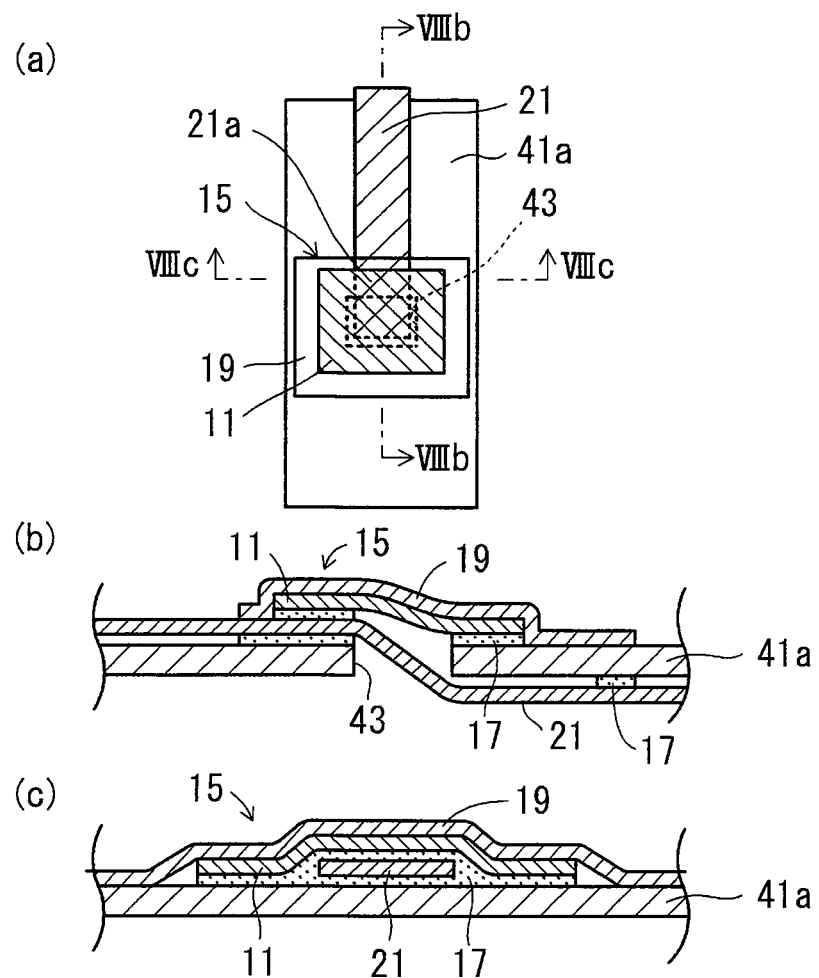
FIG. 8 (a) is a plan view showing in detail a structure around a through hole of an input unit housing according to a second embodiment, FIG. 8 (b) is a cross section along line VIIIb-VIIIb and FIG. 8 (c) is a cross section along line VIIIc-VIIIc.

FIG. 8 (*a*) is a plan view showing in detail a structure around through hole 43 of input unit housing 41 in a second embodiment, FIG. 8 (*b*) is a cross section along line VIIIb-VIIIb and FIG. 8 (*c*) is a cross section along line VIIIc-VIIIc. In the drawings, the same component as the first embodiment is denoted by the same reference character, and the description thereof will not be repeated. In connection with the present embodiment as well, a seal structure provided to slide portion 8 of the slide-type portable terminal as shown in FIG. 1 will be described.

In the present embodiment, in addition to the components in the first embodiment, a seal tape 19 sealing and attaching spacer member 11 to housing 41*a* is provided.

The structure around through hole 33 of display unit housing 31 is basically similar to the structure shown in FIG. 8 (*a*) to FIG. 8 (*c*).

In the present embodiment, seal tape 19 is provided in addition to the seal structure of the first embodiment. Therefore, detachment of spacer member 11 from the housing due to long-term use can be prevented with higher reliability.

Third Embodiment

Figure 9:
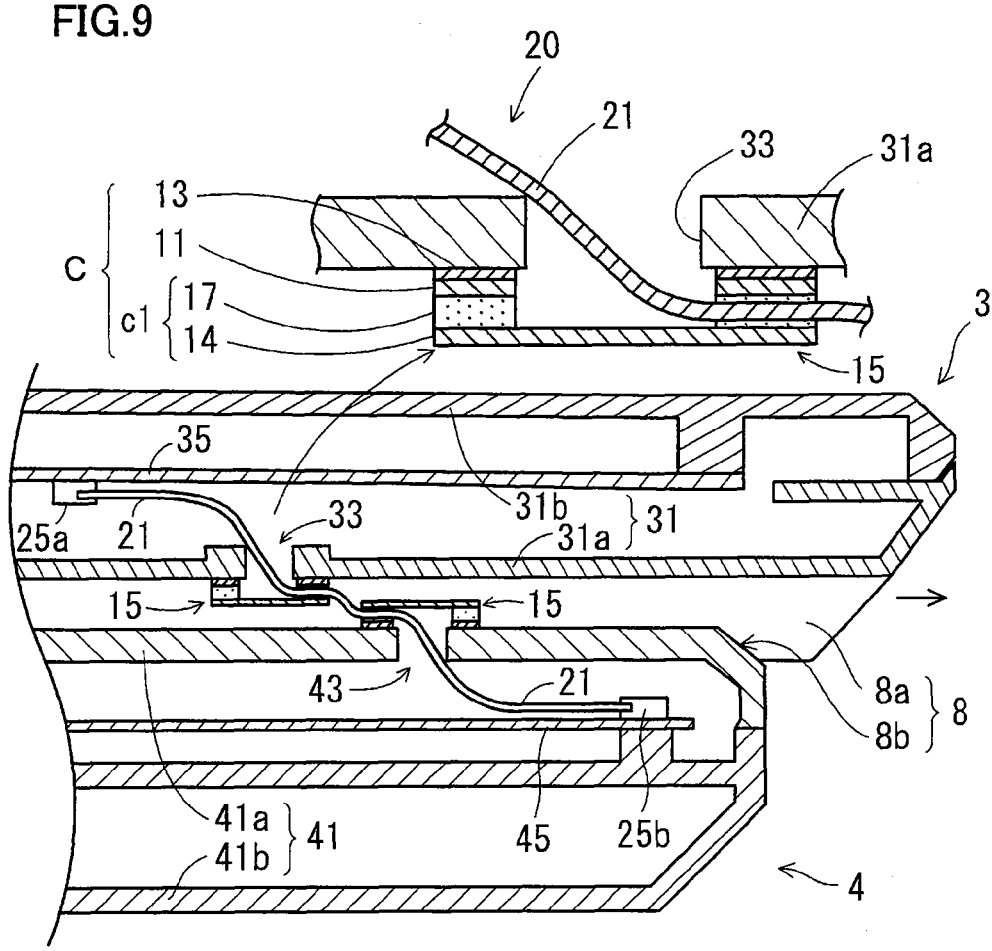
FIG. 9 is a cross section showing a structure of a connecting portion by means of a slide portion in a portable terminal according to a third embodiment.

FIG. 9 is a cross section showing a structure of a connecting portion by means of slide portion 8 in portable terminal 1 according to a third embodiment. Here, any component corresponding to the one in the first embodiment is denoted by the same reference character.

As shown in the partially enlarged cross section in FIG. 9, around through hole 33 of first housing 31*a* of display unit housing 31, a seal structure 15 for sealing the inside of the housing is provided. Seal structure 15 includes a spacer member 11 in which an FPC 21 is inserted, and a lid member 14 covering spacer member 11. Further, an adhesive layer 17 in which a part of FPC 21 is embedded and which fills the gap between spacer member 11 and lid member 14 is provided.

Seal structure 15 also includes a double-sided waterproof tape 13 that is a securing member for securing spacer member 11 to first housing 31a. Spacer member 11, lid member 14, adhesive layer 17, and double-sided waterproof tape 13 constitute a covering C that secures FPC 21, spacer member 11 and first housing 31a to each other and seal them on one side of spacer member 11.

Figure 10:
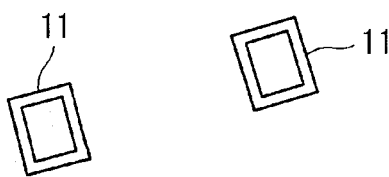
FIG. 10 (a) to FIG. 10 (c) are each a plan view illustrating a procedure for forming a wire body according to the third embodiment.
Figure 10:
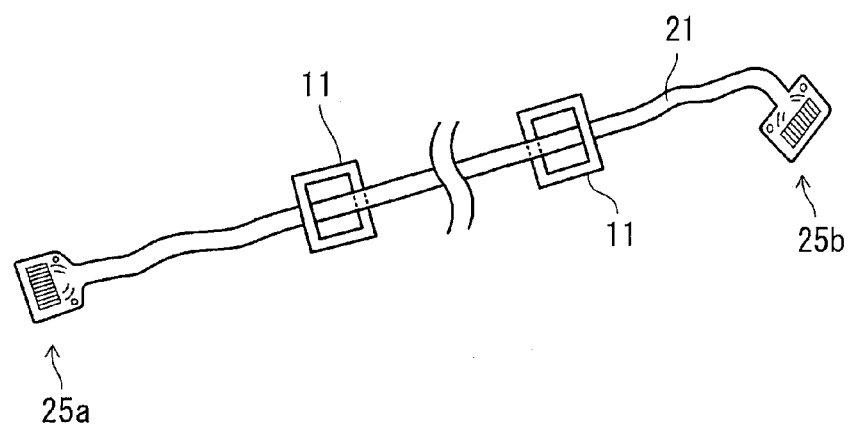
Figure 10:
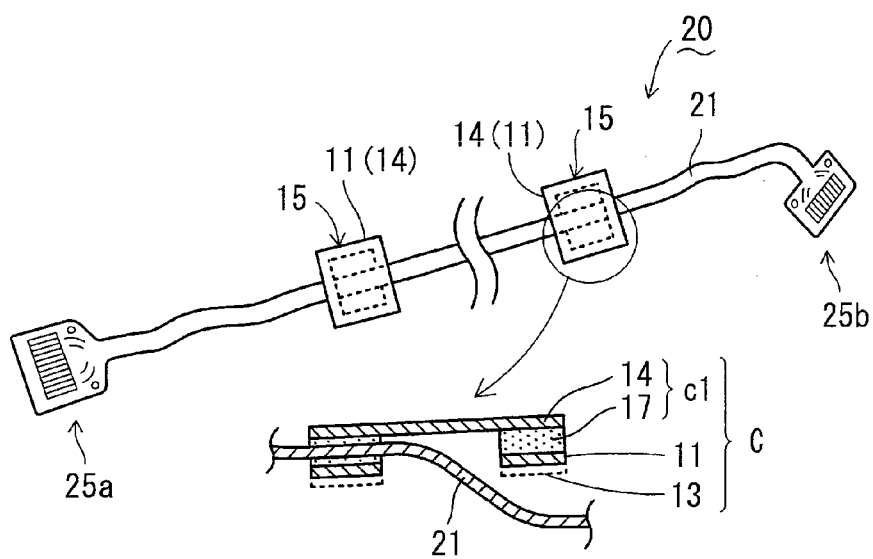

FIG. 10 (a) to FIG. 10 (c) are each a plan view illustrating a procedure for forming a wire body 20 according to the third embodiment.

First, as shown in FIG. 10 (a), two spacer members 11 having respective openings are prepared. Then, as shown in FIG. 10 (b), FPC 21 is inserted in respective openings of spacer members 11. After this, to the opposite ends of FPC 21, harness portions 25a and 25b are attached respectively. Alternatively, harness portions 25a and 25b may be first attached and then FPC 21 may be inserted in spacer members 11.

Next, lid member 14 to which an adhesive sheet such as epoxy resin is attached is attached onto spacer member 11 and FPC 21. Then, heat is applied to make the epoxy resin or the like fluid, and adhesive layer 17 is formed. As shown in the partially enlarged cross section in FIG. 10 (c), a part of FPC 21 is embedded in adhesive layer 17 and adhesive layer 17 fills the gap between spacer member 11 and lid member 14. In this way, wire body 20 is formed. Instead of using the adhesive sheet, a liquid epoxy resin or the like may be applied into the gap between lid member 14 and spacer member 11.

For wire body 20 as described above, lid member 14 and adhesive layer 17 constitute a covering portion c1 sealing FPC 21, lid member 14 and spacer member 11.

As shown in the partially enlarged cross section in FIG. 10 (c), double-sided waterproof tape 13 (indicated by the broken line) may be attached to the other side (rear surface) of spacer member 11 at this stage to form covering C.

Figure 11:
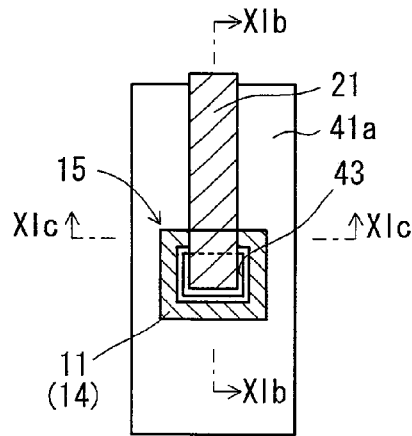
FIG. 11 (a) is a plan view showing in detail a structure around a through hole of an input unit housing, FIG. 11 (b) is a cross section along line XIb-XIb and FIG. 11 (c) is a cross section along line XIc-XIc.
Figure 11:
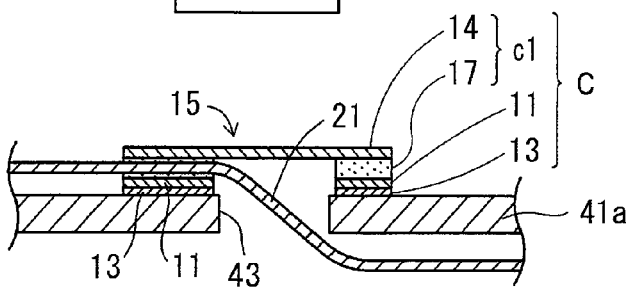
Figure 11:
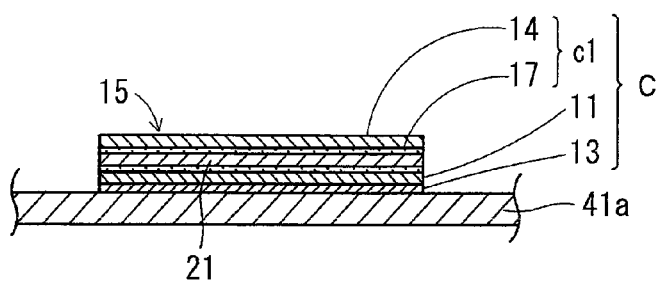

FIG. 11 (a) is a plan view showing in detail a structure around through hole 43 of input unit housing 41, FIG. 11 (b) is a cross section along line XIb-XIb and FIG. 11 (c) is a cross section along line XIc-XIc. In FIG. 11 (a), lid member 14 is illustrated as a transparent body.

As shown in FIG. 11 (b), wire body 20 shown in FIG. 10 (c), namely wire body 20 formed by attaching in advance spacer member 11, adhesive layer 17 and lid member 14 for example to FPC 21, is inserted into through hole 43. Then, double-sided waterproof tape 13 serving as a securing member is used to secure spacer member 11 to the peripheral region of through hole 43 of first housing 41a. In this way, seal structure 15 sealing first housing 41a is formed. FPC 21 (wire member) extends through the opening of spacer member 11 and through hole 43 into first housing 41a.

Seal structure 15 around through hole 33 of display unit housing 31 is basically similar to the structure shown in FIG. 4 (a) to FIG. 4 (c) (see the enlarged cross section in FIG. 2).

With seal structure 15 as described above, the inside of housings 31, 41 each is sealed, and water and moisture are prevented from entering substrates 35, 45 each. Portable terminal 1 in the present embodiment therefore has the waterproof structure that can be used in a water or humid environment.

The wire member used for wire body 20 is not limited to FPC 21. Instead of FPC 21, a rigid printed circuit board (PCB), flat cable or the like may be used. To any of these flat wire members, spacer member 11 can be attached to achieve the waterproof structure.

As the resin for adhesive layer 17, any of epoxy resin, acrylic resin, polyimide resin, polyurethane resin and the like may be used. In the case where double-sided waterproof tape 13 as described above is provided, double-sided waterproof tape 13 can be peeled off for making repair. Therefore, the resin for adhesive layer 17 may not have repairability in such a case.

As the material for lid member 14, the same material as spacer member 11 may be used.

Double-sided waterproof tape 13 may be formed for example by applying butyl rubber, acrylic pressure-sensitive adhesive or the like to both sides of a base film such as polyethylene "warifu" (split-fiber nonwoven fabric) base, polyester nonwoven fabric, aluminum foil or the like.

It should be noted that the securing member of the present invention is not limited to the double-sided waterproof tape, and may be an adhesive of epoxy resin, acrylic resin, polyimide resin, polyurethane resin or the like. In this case, a resin adhesive with repairability like that in the first embodiment is used.

In above-described seal structure 15, the components each have the following thickness. Lid member 14 has a thickness of approximately 12.5 to 125 µm. Spacer member 11 has a thickness of approximately 12.5 to 125 µm. FPC 21 has a thickness of approximately 50 to 1000 µm. The total thickness of adhesive layer 17 including the thickness of FPC 21 is approximately 60 to 1500 µm. The thickness of double-sided waterproof tape 13 is approximately 50 to 500 µm.

Accordingly, seal structure 15 having a total thickness of approximately 135 to 2250 µm is a thin structure. Therefore, the seal structure can be easily disposed at any place with a limited space such as slide portion 8 of a slide-type portable terminal.

The present embodiment can achieve the following functions and effects. Spacer member 11 has a simple structure that only requires an opening. Spacer member 11 is thus formed separately from FPC 21 (wire member) and therefore flexibly adaptable to design change of FPC 21 or the like. Further, because integration with FPC 21 or the like is unnecessary, the material can be selected from a wider range of alternatives. In this way, the waterproof structure can be implemented at low cost using spacer member 11 with the simple structure.

First Modification of Third Embodiment

Figure 12:
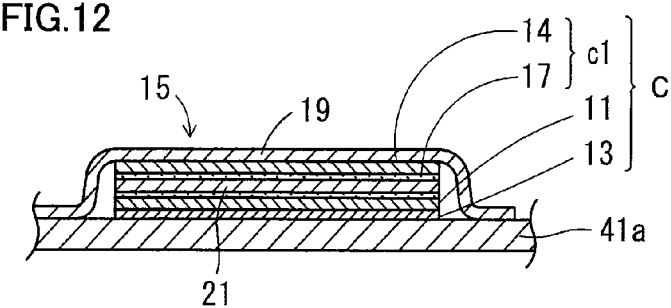
FIG. 12 is a cross section of a seal structure according to a first modification of the third embodiment.

FIG. 12 is a cross section of a seal structure 15 according to a first modification of the third embodiment. In FIG. 12, the cross section of seal structure 15 as shown corresponds to the cross section of FIG. 11 (c).

Seal structure 15 of the present modification includes a seal tape 19 (tape member) that is laid over covering C and the peripheral region of the through hole of the housing, in addition to the components of the third embodiment.

As seal tape 19, so-called single-sided waterproof tape for example may be used. Seal tape 19 may be formed for example by applying butyl rubber, acrylic pressure-sensitive adhesive or the like to one side of a base film such as polyethylene "warifu" (split-fiber nonwoven fabric) base, polyester nonwoven fabric, aluminum foil or the like.

The present modification not only enhances the waterproof capability but also improves the reliability of seal structure 15. More specifically, when tensile stress or the like is exerted on FPC 21, adhesive layer 17 and lid member 14 (covering C) can be surely prevented from being peeled off or broken.

Second Modification of Third Embodiment

Figure 13:
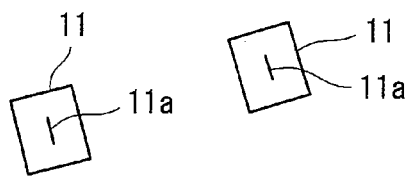
FIG. 13 (a) to FIG. 13 (c) are each a plan view illustrating a procedure for forming a wire body according to a second modification of the third embodiment.
Figure 13:
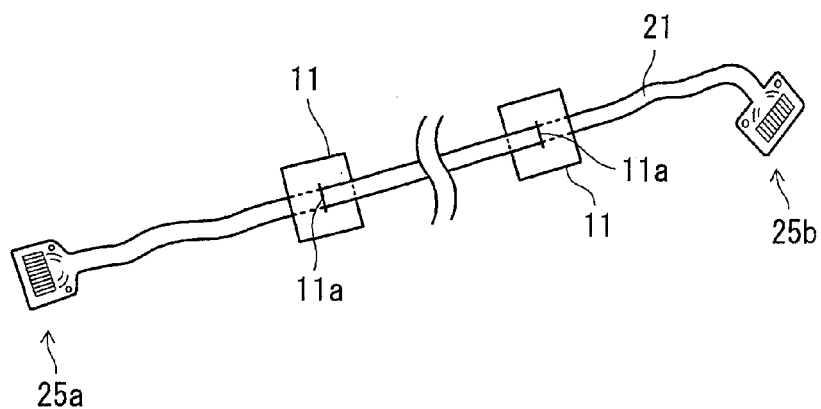
Figure 13:
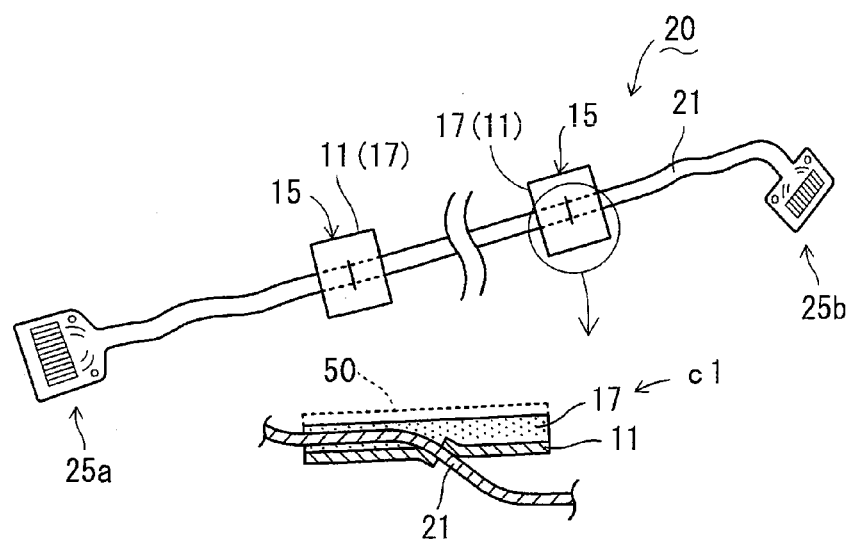

FIG. 13 (a) to FIG. 13 (c) are each a plan view illustrating a procedure for forming a wire body 20 according to a second modification of the third embodiment.

First, as shown in FIG. 13 (a), two flat spacer members 11 are prepared. In spacer member 11, a cut 11a is formed as an opening in which FPC 21 can be inserted. Instead of cut 11a, a slit may be formed as an opening in which FPC 21 can be inserted.

Wire body 20 is formed by first inserting FPC 21 in respective cuts 11a of spacer members 11 as shown in FIG. 13 (b). After this, harness portions 25a and 25b are attached to the opposite ends of FPC 21, respectively. As described above, harness portions 25a and 25b may be attached in advance to FPC 21. Cuts 11a or the like are dimensioned so that harness portions 25a and 25b can be inserted, which is a matter of course in this case.

Next, an adhesive in liquid state such as epoxy resin is dropped on spacer members 11 and FPC 21. Then, as shown in the enlarged drawing in FIG. 13 (c), a press plate 50 is used to apply pressure from above, during which the epoxy resin or the like is hardened to form adhesive layer 17. After this, press plate 50 is removed. For press plate 50, a material with less adhesiveness such as fluorocarbon polymer or the like is used.

A part of FPC 21 is embedded in adhesive layer 17 while adhesive layer 17 fills the gap in cut 11a of spacer member 11. Namely, one side of spacer member 11 is sealed by adhesive layer 17 only. In this way, wire body 20 is formed.

In wire body 20 of the second modification, adhesive layer 17 and spacer member 11 constitute a covering c1 that seals FPC 21.

For this second modification as well, as shown in the enlarged drawing in FIG. 10 (c), double-sided waterproof tape 13 may be attached at this stage to the other side (rear surface) of spacer member 11.

After this, like the structure shown in FIG. 11 (a) to FIG. 11 (c), spacer member 11 is secured to first housings 31a and 41a by means of securing member 13 such as double-sided waterproof tape. In this way, a seal structure using wire body 20 of the second modification can be obtained (not shown).

This second modification can achieve the waterproof structure without using the lid member. Because the lid member is unnecessary, the seal structure thinner than the third embodiment can be obtained.

Here, on adhesive layer 17 of the second modification, seal tape 19 shown in FIG. 11 may be attached. Thus, deterioration of the reliability due to lack of the lid member can be prevented.

Third and Fourth Modifications of Third Embodiment

Figure 14:
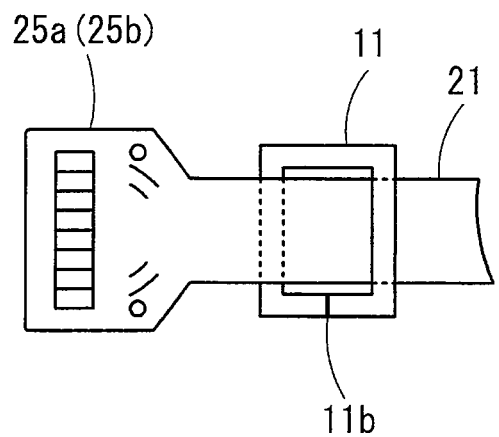
FIG. 14 (a) and FIG. 14 (b) are plan views showing spacer members according to third and fourth modifications respectively of the third embodiment.
Figure 14:
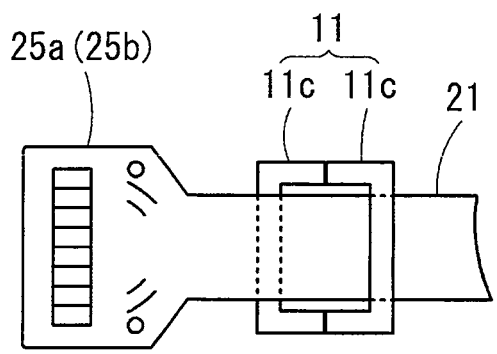

FIG. 14 (a) is a plan view of a spacer member according to a third modification of the third embodiment, and FIG. 14 (b) is a plan view showing a spacer member according to a fourth modification of the third embodiment.

In the case where FPC 21 to which harness portions 25a, 25b are attached in advance is used and this FPC 21 is inserted in an opening of spacer member 11, it is necessary for spacer members 11 shown in FIG. 10 (a) and FIG. 13 (a) to have the opening with a larger width than the width of harness portions 25a, 25b, since the peripheral region of the opening is closed.

Therefore, in the case where the width of harness portions 25a, 25b is considerably larger than the width of the FPC, it is accordingly necessary for spacer member 11 to have an opening width considerably larger than the width of the FPC. Such an opening has to be filled with an adhesive, which is not particularly preferred.

Then, spacer member 11 according to the third modification of the third embodiment as shown in FIG. 14 (a) has one separation 11b extending laterally outward from the opening.

Accordingly, even in the case of FPC 21 to which harness portions 25a, 25b are attached in advance, a part of FPC 21 may be held to laterally and directly insert FPC 21 into the opening through separation 11b.

Separation 11b can be closed in a later process of forming adhesive layer 17. Therefore, the dimension of the opening of spacer member 11 may be adapted to the width of FPC 21, and the favorable seal structure can be obtained.

Further, regarding spacer member 11 according to the fourth modification of the third embodiment, shown in FIG. 14 (b), spacer member 11 is constituted of a pair of separate spacer pieces 11c and 11c. The pair of spacer pieces 11c and 11c is configured in the fourth modification so that the opposite sides of the opening that extend in the direction along which FPC 21 is inserted are each separated.

Accordingly, even in the case of FPC 21 to which harness portions 25a, 25b are attached in advance, a pair of spacer pieces 11c and 11c can be attached. Thus, FPC 21 can be inserted in the opening of spacer member 11.

Spacer pieces 11c and 11c of the pair can be integrated into one spacer in a later process of forming adhesive layer 17. In other words, although it is necessary for spacer member 11 to be an annular integrated unit having an opening when incorporated in seal structure 15, spacer member 11 may not necessarily be an integrated unit before incorporated in the seal structure.

Regarding this fourth modification as well, the dimension of the opening of spacer member 11 constituted of spacer pieces 11c and 11c may be adapted to the width of FPC 21, and the favorable seal structure can be obtained.

Fourth Embodiment

Figure 15:
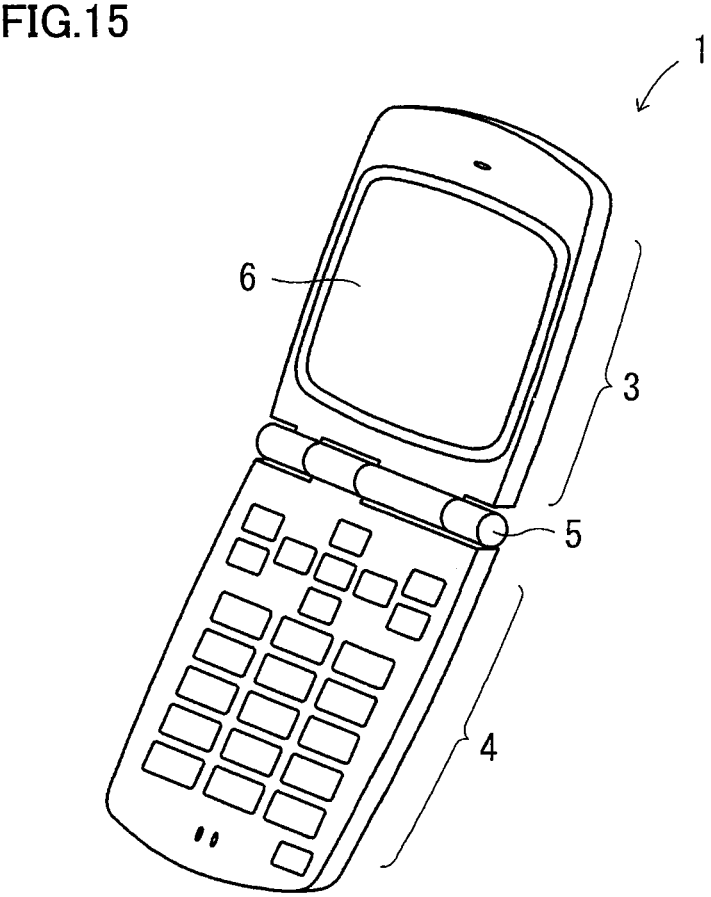
FIG. 15 is a perspective view schematically showing a structure of a flip-type portable terminal according to a fourth embodiment.

FIG. 15 is a perspective view schematically showing a structure of a flip-type portable terminal 1 (electronic apparatus) according to a fourth embodiment.

Portable terminal 1 includes a display unit 3 for displaying various kinds of information, an input unit 4 and a hinge portion 5. Display unit 3 is provided with a display apparatus 6 for which a liquid crystal display panel is used, and a speaker, for example. Input unit 4 is provided with input keys and a microphone, for example. Hinge portion 5 pivotably couples input unit 4 and display unit 3 to each other.

Figure 16:
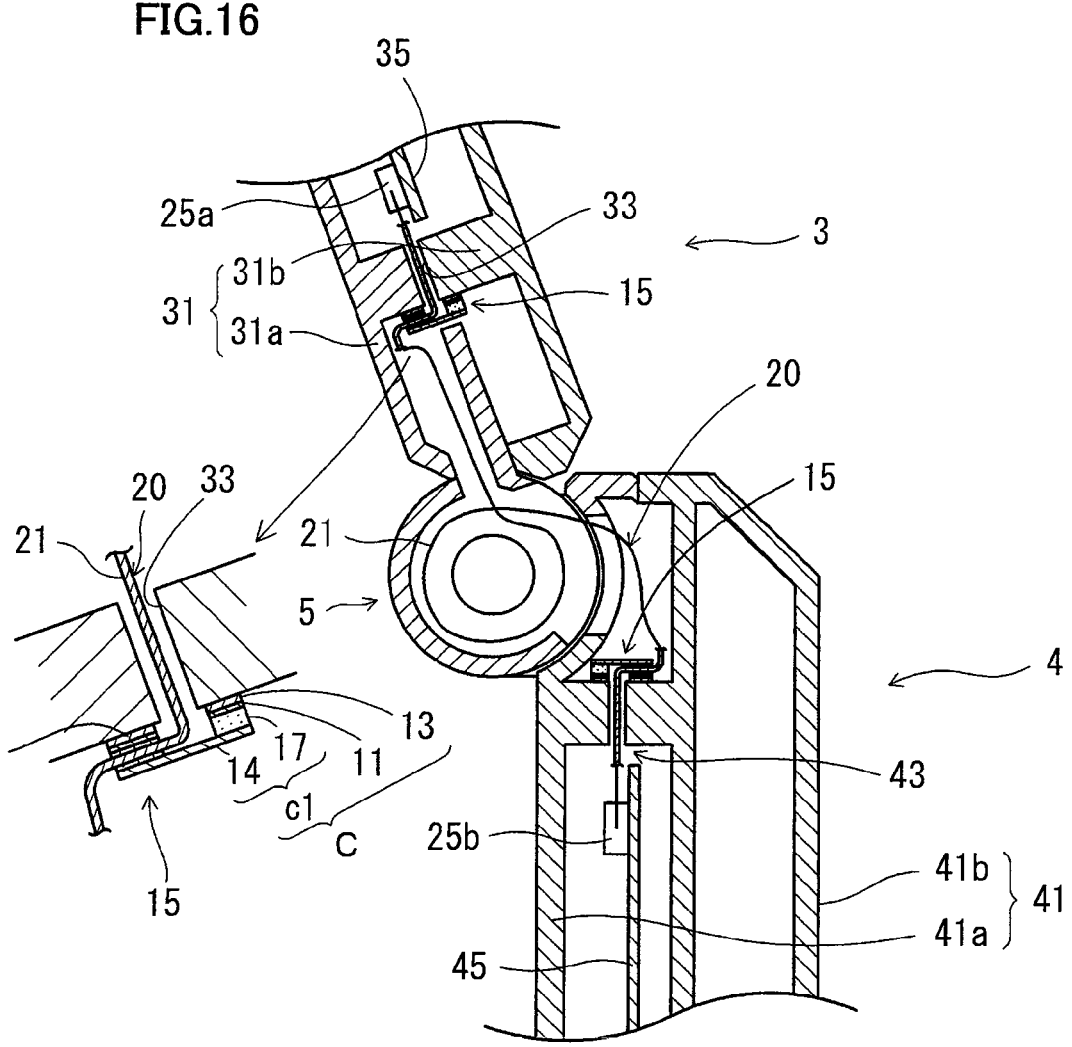
FIG. 16 is a cross section showing a structure of a connecting portion by means of a hinge portion in a portable terminal according to the fourth embodiment.

FIG. 16 is a cross section showing a structure of a connecting portion by means of hinge portion 3 of portable terminal 1 according to the second embodiment. In FIG. 16, any component having the same capability as a component shown in FIG. 2 of the first embodiment is denoted by the same reference character, and the description thereof will not be repeated.

In the present embodiment, a display unit housing 31 has a through hole 33 between a first housing 31a and a second housing 31b. An input unit housing 41 also has a through hole 43 between a first housing 41a and a second housing 41b.

A wire body 20 is also provided to connect an input unit substrate 45 and a display unit substrate 35 through hinge portion 5. Wire body 20 includes FPC 21 and harness portions 25a and 25b provided at the opposite ends of FPC 21. Harness portions 25a and 25b are connected to substrates 35 and 45, respectively so that signals can be transmitted and received therebetween.

As shown in the partially enlarged drawing in FIG. 16, a seal structure 15 is provided around through hole 33 of display unit housing 31 and through hole 43 of input unit housing 41.

In the present embodiment as well, seal structure 15 is constituted using spacer member 11, double-sided waterproof tape 13 (securing member), lid member 14, and adhesive layer 17. Namely, the structure and capabilities of seal structure 15 are those as described in connection with the first and third embodiment.

In other words, wire body 20 and seal structure 15 of the present invention are applicable to not only the slide-type portable terminal but also the flip-type portable terminal.

It should be noted here that the present invention can exhibit excellent effects when applied to electronic apparatuses such as the slide-type portable terminal in which a space is limited and waterproof is difficult with other seal structures.

To the present embodiment as well, the first and second modifications of the third embodiment can be applied.

Other Embodiments

The structures of the embodiments of the present invention as disclosed above are presented by way of example and illustration only. The scope of the present invention is therefore not limited to the disclosure herein. The scope of the invention includes the scope defined by the claims. Further, the scope of the invention includes all modifications equivalent in meaning and scope to the claims.

Industrial Applicability

The wire body and the seal structure of the present invention are applicable to electronic apparatuses such as portable terminal, PDA, personal computer, and digital camera.

DESCRIPTION OF THE REFERENCE SIGNS

C covering; c1 covering portion; 1 portable terminal (electronic apparatus); 3 display unit; 4 input unit; 6 display apparatus; 8 slide portion; 8a outer frame; 8b inner frame; 11 spacer member; 11a cut; 11b separation; 11c spacer piece; 13 double-sided waterproof tape; 14 lid member; 15 seal structure; 17 adhesive layer; 19 seal tape; 20 wire body; 21 FPC (wire member); 25a, 25b harness portion; 31 display unit housing; 31a first housing; 31b second housing; 33 through hole; 35 display unit substrate; 41 input unit housing; 41a first housing; 41b second housing; 43 through hole; 45 input unit substrate; 50 press plate

The invention claimed is:

1. A seal structure comprising:
    a covering for sealing a through hole of a housing with a wire member inserted in the through hole,
    said covering including:
        a covering member disposed on one side of said through hole, the covering member comprising a flexible resin sheet; and
        an adhesive layer securing said covering member and said wire member to each other and securing both said covering member and said wire member to said housing, wherein:
    a part of said wire member being held between said covering member and said housing,
    said adhesive layer being secured to said covering member so that said adhesive layer surrounds a whole perimeter of a region of said covering member located above said through hole, and
    a portion of said adhesive layer located between said wire member and said housing and a portion of said adhesive layer located between said wire member and said covering member are integrated.

2. The seal structure according to claim 1, wherein:
    said covering further includes a spacer member having an opening in which said wire member is inserted, and
    a part of said wire member is embedded in said adhesive layer and said adhesive layer closes said opening.

3. The seal structure according to claim 2, wherein:
    said covering member is a lid member opposite to said spacer member with a part of said wire member held between said lid member and said spacer member, and
    a part of said wire member is embedded in said adhesive layer and said adhesive layer closes a gap between said spacer member and said lid member.

4. The seal structure according to claim 2, wherein said covering includes a securing member disposed between a region of said housing surrounding said through hole and said spacer member.

5. The seal structure according to claim 4, wherein
    said securing member is a double-sided waterproof tape.

6. The seal structure according to claim 1, wherein said adhesive layer is formed of a resin adhesive with repairability.

7. The seal structure according to claim 6, wherein said resin adhesive is a mixture of a thermosetting resin and a thermoplastic resin.

8. The seal structure according to claim 1, further comprising:
    a tape member covering said covering and a region around said through hole.

9. A method of forming the seal structure as recited in claim 1, the method comprising steps of:
    (a) inserting said wire member into said through hole;
    (b) filling, with a resin adhesive, a space between said covering member and said wire member and a space between said covering member and said housing and between said wire member and said housing in a closed annular region surrounding said through hole of said housing; and
    (c) solidifying said resin adhesive.

10. The method of forming the seal structure according to claim 9, wherein:
    in said step (b), a spacer member is disposed between said housing and said wire member and a resin body of said resin adhesive is provided on at least a part of a surface of said spacer member opposite to said wire member or said housing, and thereafter said covering member opposite to said spacer member with a part of said wire member held between said covering member and said spacer member is pressed from above toward said spacer member.

* * * * *